April 21, 1925.  1,534,365
T. A. DUNN
COMBINED CUSHION AND PNEUMATIC TIRE
Filed Sept. 15, 1921
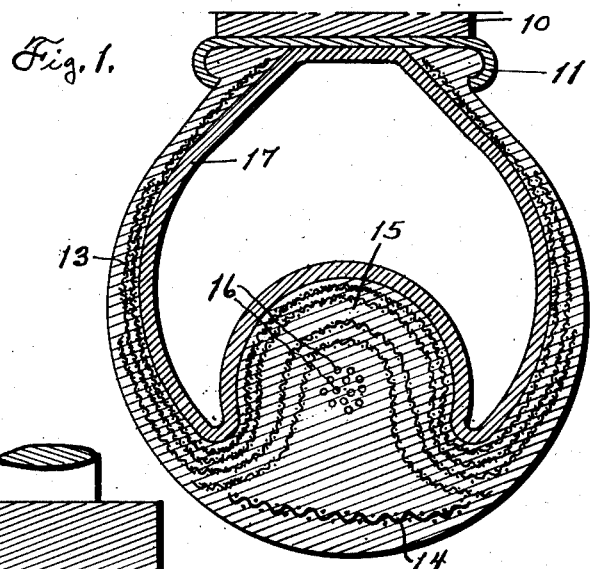
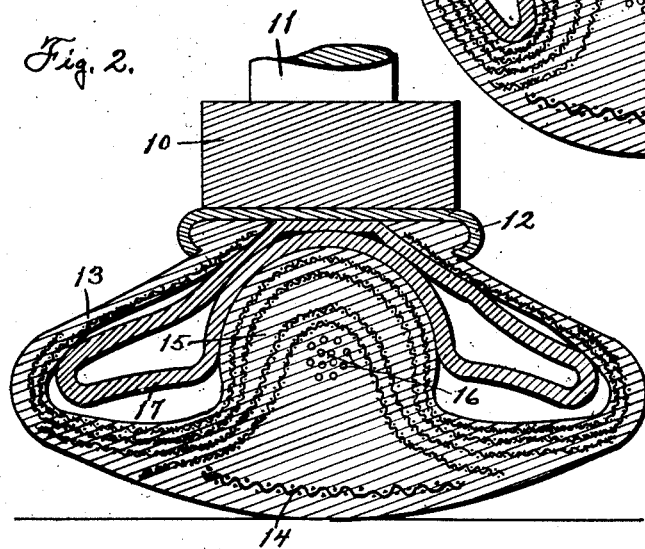
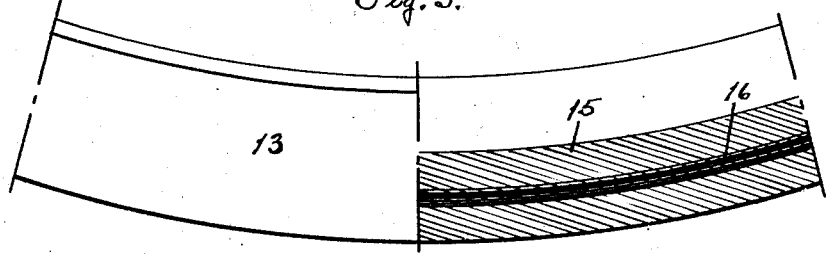
INVENTOR:
T. A. DUNN
By Earl M. Sinclair
Atty.

Patented Apr. 21, 1925.

1,534,365

UNITED STATES PATENT OFFICE.

THOMAS A. DUNN, OF JAMAICA, IOWA.

COMBINED CUSHION AND PNEUMATIC TIRE.

Application filed September 15, 1921. Serial No. 500,825.

*To all whom it may concern:*

Be it known that I, THOMAS A. DUNN, a citizen of the United States of America, and resident of Jamaica, Guthrie County, Iowa, have invented a new and useful Combined Cushion and Pneumatic Tire, of which the following is a specification.

The object of this invention is to provide an improved pneumatic and cushioned tire.

A further object of this invention is to provide an improvement in a tire whereby punctures on the tread of the tire are prevented, stone bruises eliminated, and danger of rim-cutting obviated.

A further object of this invention is to provide an improved tire constructed with an integral inner cushion member extending circumferentially thereof to increase the thickness of the tread and consequently eliminate punctures and stone bruises thereon and also furnishing a cushioning effect with relation to the rim when the tire is partially or completely deflated, thereby preventing rim cutting and breaking down of the side-walls of the tire.

My invention consists in the construction, arrangement and combination of elements hereinafter set forth, pointed out in my claim and illustrated by the accompanying drawing, in which—

Figure 1 is a cross-section of a tire in normal inflated condition, showing my improvement. Figure 2 is a similar view of a deflated tire illustrating the cushioning effect. Figure 3 shows a segment of a tire, partly in elevation and partly in longitudinal section.

In the construction of the device as shown the numeral 10 designates a felloe carried by spokes 11 and in turn carrying a rim 12 of common form, in this instance of clincher type. The numeral 13 designates a tire casing, which in the main is of common and well known form and adapted to be secured in the ordinary manner to, and carried by, the rim 12. The casing 13 preferably is of fabric and rubber and constructed, according to the usual process, with the usual breaker strip 14. The casing 13, according to my improvement, is constructed with an integral, circumferentially extending cushion member 15 of annular form on the inner periphery of its tread portion, which member preferably is formed principally of fabric and is suitably vulcanized and cured. The cushion member 15 as here shown is substantially circular in cross-section, and of sufficient diameter to extend practically one-half the distance from the line of the inner periphery of the tread of the casing to the rim 12. That portion of the cushion member 15 projecting from the inner periphery of the casing should present, in cross-section, not less than one-half the circumference of a complete circle, and preferably subtends an arc in the neighborhood of two hundred and ten degrees or more. This arrangement causes very considerable grooves or annular depressions between the cushion member and the opposite side walls of the casing, when the tire is inflated as in Figure 1, these grooves or depressions being substantially V-shaped in cross-section. This is of value in that it permits perfect hinging or flexing of the side walls of the casing when partially deflated as in Figure 2, preventing rim cutting and breaking of the walls of the tire especially at the points where the cushion member joins the side walls. It is to be understood, however, that the composition, size and form of the cushion member may be varied and altered as desired, within the scope of the claim. I prefer, also, to embed a plurality of wires 16 in and extending centrally and longitudinally of the cushion member 15, to add strength, durability and rigidity thereto.

The casing so constructed is designed to contain the usual inner tube 17, which is inflated, for ordinary use, in the common manner. When so used the cushion member 15, adding materially to the thickness of the tread portion of the tire, practically prevents punctures and stone bruises from occurring therein. In case the tire becomes deflated to any considerable extent the cushion member, by providing a support and cushion between the tread and rim, prevents rim cutting or breaking down of the side-walls of the casing and injury to the tube. In an emergency the vehicle equipped with this tire may be driven a considerable distance on the tire without injury either to the casing or tube, as the cushion acts as shown in Figure 2, as a buffer between the rim and tread portion of the tire.

It is to be understood that this improvement may be applied to straight side or other casings as well as to the clincher type.

I claim as my invention—

An improved pneumatic and cushion tire, comprising a casing formed with an integral, circumferentially extending cushion member on the inner periphery of its tread portion, said cushion member being substantially circular in cross-section, subtending an arc of not less than one hundred and eighty degrees and of sufficiently great diameter that it extends substantially one-half the distance from the periphery of the casing to the rim portion thereof when in normal condition, thereby producing annular grooves between said cushion member and the opposite side walls of the casing, which grooves are substantially V-shaped in cross-section when the tire is inflated, and whereby the normal thickness of the casing at opposite sides of said cushion member is not materially increased.

Signed at Des Moines, in the county of Polk and State of Iowa, this 23d day of August, 1921.

THOMAS A. DUNN.